United States Patent [19]
Brilka et al.

[11] Patent Number: 5,526,061
[45] Date of Patent: Jun. 11, 1996

[54] CIRCUIT ARRANGEMENT FOR DEMODULATING A VIDEO SIGNAL

[75] Inventors: Joachim Brilka; Thomas Hafemeister; Wolfgang Weltersbach, all of Hamburg, Germany

[73] Assignee: U.S. Philips Corporation, New York, N.Y.

[21] Appl. No.: 407,434

[22] Filed: Mar. 17, 1995

[30] Foreign Application Priority Data

Mar. 23, 1994 [DE] Germany .......................... 44 09 981.9
Apr. 11, 1994 [DE] Germany .......................... 44 12 910.6

[51] Int. Cl.$^6$ ................................................. H04N 5/455
[52] U.S. Cl ........................... 348/726; 348/537; 348/735
[58] Field of Search ..................................... 348/725, 726, 348/571, 678, 682, 516, 735, 536, 537, 491, 475; H04N 5/455, 5/16, 9/475

[56] References Cited

U.S. PATENT DOCUMENTS

| | | | |
|---|---|---|---|
| 4,091,410 | 5/1978 | Ciha ......................................... | 348/726 |
| 4,633,315 | 12/1986 | Kasperkovitz ........................... | 348/726 |
| 5,105,273 | 4/1992 | Hyakutake .............................. | 358/160 |
| 5,122,879 | 6/1992 | Ito .......................................... | 348/735 |
| 5,235,422 | 8/1993 | Ido et al. ................................ | 348/537 |

FOREIGN PATENT DOCUMENTS

| | | | |
|---|---|---|---|
| 4021912 | 1/1991 | Germany .......................... | H04N 5/455 |
| 4040298 | 6/1992 | Germany .......................... | H04N 5/16 |
| 4311943 | 10/1994 | Germany .......................... | H03G 3/30 |

OTHER PUBLICATIONS

"An Advanced 5V Vif–/SiF PLL for Signal Detection in TV Sets and VTRs" published in IEEE Trans, Cons. 1991, vol. 37, No. 4.

Discourse No. 23 by O. Hermsdorfer, "Der Synchrongleichrichter im Nyauist Messdemoulator—Aufereitung des Schalttragers and Auswirkungen von Phasenstorhub auf das demodulierte Signal"—FKTG conf. Oct. 4–Oct. 7, 1976.

Primary Examiner—James J. Groody
Assistant Examiner—Jeffrey S. Murrell
Attorney, Agent, or Firm—Bernard Franzblau

[57] ABSTRACT

Circuit arrangement for demodulating a video signal (IF signal) which is frequency-modulated on an intermediate-frequency carrier oscillation, including a first demodulation stage (a frequency or phase demodulator) for multiplicatively combining the IF signal with a carrier oscillation of a controllable oscillator and for supplying a first output signal, a second demodulation stage (a frequency or phase demodulator) for multiplicatively combining the IF signal with the carrier oscillation phase-shifted by a quarter period of the intermediate-frequency carrier oscillation, and for supplying a second output signal, a first filter stage for low-pass filtering the first output signal and for supplying a third output signal, a multiplier stage for multiplicatively combining the second output signal and the third output signal to form a fourth output signal, a superposition stage for forming a seventh output signal by additively combining a fifth output signal and a sixth output signal derived from the second output signal and the fourth output signal, and a second filter stage for deriving a control signal from the seventh output signal for controlling the frequency and/or phase of the controllable oscillator. To ensure a reliable operation, also upon overmodulation, this circuit includes a first coefficient member for deriving the fifth output signal from the second output signal, and a second coefficient member for deriving the sixth output signal from the fourth output signal, the signal applied to each coefficient member being multiplied by a predeterminable coefficient (k1, k2) for forming the signal derived therefrom, wherein the coefficient (k1) of the first coefficient member being chosen is larger than the coefficient (k2) of the second coefficient member.

11 Claims, 3 Drawing Sheets

CIRCUIT ARRANGEMENT FOR DEMODULATING A VIDEO SIGNAL

BACKGROUND OF THE INVENTION

1. Field of the Invention

The invention relates to a circuit arrangement for demodulating a video signal (IF signal) which is frequency-modulated on an intermediate-frequency carrier oscillation, comprising

- a first demodulation stage formed as a frequency or phase demodulator for multiplicatively combining the IF signal with a carrier oscillation of a controllable oscillator and for supplying a first output signal formed from this combination,
- a second demodulation stage formed as a frequency or phase demodulator for multiplicatively combining the IF signal with the carrier oscillation phase-shifted by a quarter period of the intermediate-frequency carrier oscillation, and for supplying a second output signal formed from this combination,
- a first filter stage for low-pass filtering the first output signal and for supplying a third output signal,
- a multiplier stage for multiplicatively combining the second and the third output signals to derive a fourth output signal,
- a superposition stage for forming a seventh output signal by additively combining a fifth and a sixth output signal derived from the second and the fourth output signals, and
- a second filter stage for deriving a control signal from the seventh output signal for controlling the frequency and/or phase of the controllable oscillator.

2. Description of the Related Art

A video demodulator comprising a FPLL is disclosed in the article "An Advanced 5 V Vif-/SiF PLL for Signal Detection in TV Sets and VTRs" published in IEEE Trans. Cons. 1991, vol. 37, no. 4. This video demodulator comprises an oscillator (VCO) from which two 90° phase-shifted oscillations are applied to a quadrature detector and to an in-phase detector via a frequency divider having a division factor of 2. Moreover, an intermediate frequency video signal is applied to these detectors. An output signal is applied as a control value from the quadrature detector to the oscillator via a current converter and a loop filter. The oscillator, the quadrature detector and the loop filter constitute a phase-locked loop. To reduce the pull-in time of this phase-locked loop during search tuning, the known arrangement also comprises a FLL which, in addition to the in-phase detector, comprises a low-pass filter and a multiplier. An output signal from the in-phase detector is applied to the multiplier via the low-pass filter, while a second input signal of the multiplier is constituted by the output signal of the quadrature detector. An output signal of the multiplier is superimposed on the current applied from the quadrature detector to the loop filter.

In this circuit arrangement, the FLL generates a current which is dependent on the frequency difference in the pull-in mode and is proportional to the phase difference in the locked mode. On the other hand, the phase-locked loop supplies a small direct current during the pull-in mode and its main current in the locked mode for controlling the phase. In the circuit arrangement described above, the currents of the FLL and the phase-locked loop are added, applied to the loop filter and subsequently applied as a control signal to the oscillator. The pull-in time is reduced by virtue of a wide pull-in range of the FLL.

An IF video signal processing circuit including a phase control circuit is known from DE-PS 40 21 912, corresponding to U.S. Pat. No. 5,105,273. This circuit comprises a synchronous demodulator which receives an intermediate-frequency video signal (IFV signal) and an output signal from a voltage-controlled oscillator and supplies a video demodulation output signal. In addition to the voltage-controlled oscillator, the phase control circuit comprises a phase control member which causes the phase of the output signal of the oscillator to lead by 90°, a phase detector which compares the phase between the output signal of the phase control member and the IFV signal, and a low-pass filter which filters the output signal of the phase detector and applies it to the control input of the voltage-controlled oscillator. In the locked state of the phase control circuit, the frequency and phase of the output signal of the voltage-controlled oscillator is rendered equal to the normal video carrier frequency of the IFV signal and applied to the synchronous demodulator. This demodulator demodulates the IFV signal synchronously on the basis of this signal while forming the video demodulation output signal.

In the circuit arrangement known from DE-PS 40 21 912, the operation of the phase detector is not only used for evaluating the IFV signal level but also is switched from PLL operation to locked operation on the basis of the video demodulation output signal. To this end, the phase detector has at least two further inputs, a first input of which receives a signal strength detection signal derived from the strength of the IFV signal, and a second input receives a modulation degree detection signal derived from the video demodulation output signal, while the video demodulation output signal is also applied to the phase detector.

In PLL operation, the phase detector compares the phase of the IFV signal and the output signal of the phase control member and supplies a phase detection signal. In the locked state, the phase detector locks in and supplies the phase detection signal supplied during the last PLL operation. To this end, the phase detector uses a capacitor which is arranged in the low-pass filter. In this known circuit arrangement, the PLL operation is switched on during the blanking periods of the video signal during which the phase detector is activated by the video demodulation output signal. In this state, the low-pass filter has a small time constant permitting fast reversals of the charge of the relevant capacitor. During the picture contents of the video demodulation output signal, the phase detector and the low-pass filter are, however, subjected to locked operation in that the phase detector is deactivated and the low-pass filter is switched to a large time constant. In this state of the low-pass filter, the relevant capacitor can reverse its charge only very slowly and the voltage value stored in this capacitor is therefore retained.

It is also known, from the discourse no. 23 by O. Hermsdörfer, "Der Synchrongleichrichter im Nyquist Messdemodulator—Aufbereitung des Schaltträgers und Auswirkungen von Phasenstörhub auf das demodulierte Signal—" held at the FKTG conference from 4 to 7 Oct. 1976, to use a phase-locked loop in an in-phase demodulator for generating a carrier for demodulating an IF picture signal. In this loop, a signal from an oscillator (VCO) is compared in a phase discriminator with a signal which is obtained from the IF picture signal via a bandpass filter and a limiter so as to obtain a control voltage for the oscillator. Due to asymmetries in the sideband spectrum of the IF picture signal, an amplitude modulation of the picture carrier may be converted to an unwanted phase modulation during limitation and rectified in the phase discriminator of the phase-locked loop. This may lead to a phase modulation of the oscillator and hence to disturbances of the video output signal which is demodulated in the in-phase demodulator with the carrier from the oscillator. To avoid this, the voltage supplied by the phase discriminator is evaluated via a sample-and-hold circuit only at the instants when there is no picture modulation, for example at the instant of the backporch, and thus a substantially complete independence of the picture content is achieved.

In circuit arrangements for receiving and processing video signals of different transmission standards, using a synchronous demodulation of the type utilized in the circuit arrangements described hereinbefore, disturbances in the demodulated sync signals occur upon overmodulation of the television transmitters in the transmission standard "SECAM-L" used in France. This is caused by the positive modulation used in "SECAM-L" with a residual carrier for the synchronous signals. Practice has proved that even an inverted phase position of the demodulated signal may occur in the demodulation by means of the known circuit arrangements. In any case, strong distortions, particularly of the vertical sync pulses, result in demodulation arrangements in which the carriers are processed by means of phase-locked loops. As a result of such disturbances, the requirements to be imposed on the quality of the processed video signals and/or sync signals can no longer be maintained by the known circuit arrangements during operation.

SUMMARY OF THE INVENTION

It is an object of the invention to provide a circuit arrangement for demodulating a video signal which supplies undisturbed demodulated signals, particularly sync signals in accordance with the "SECAM-L" mode, even upon overmodulation.

According to the invention, this object is achieved in a circuit arrangement of the type described in the opening paragraph by a first coefficient member for deriving the fifth output signal from the second output signal, and a second coefficient member for deriving the sixth output signal from the fourth output signal, the signal applied to each coefficient member being multiplied by a predeterminable coefficient for forming the signal derived therefrom and the coefficient of the first coefficient member being chosen to be larger than that of the second coefficient member.

The characteristic curve of a frequency or phase demodulator in which the signal to be demodulated is multiplicatively combined with a carrier oscillation, i.e., the value of the output signal of the frequency or phase demodulator as a function of the phase angle between the two supplied signals, has a cosine-shaped variation. This characteristic curve thus has the same slope at a phase angle of 90° as at a phase angle of −90°, of course with opposite signs. The output signal of the frequency or phase demodulator, and hence a control signal which can be derived therefrom to control a controllable oscillator, is thus exactly as large and has the same sign for the correct phase angle of 90° between the signals applied to the frequency or phase demodulator, as for the inverted phase position at a phase angle of 90°, as occurs in overmodulated carrier oscillations with a phase jump of 180° in the negative direction. Consequently, a phase-locked loop with such a frequency or phase demodulator having the same loop gain or slope of the control of the oscillator will follow both the desired phase position of the carrier oscillation (phase angle 90°) and the unwanted phase sequence upon overmodulation (phase angle −90°).

On the other hand, in the circuit arrangement according to the invention, a changed characteristic curve is generated which is formed by a linear combination of the described characteristic curve in accordance with the cosine function with a characteristic curve portion following the product of the sine and cosine of the phase angle. The coefficients of this linear combination are chosen such that a very smooth characteristic curve variation having a slope which is inverted with respect to the correct phase position is formed in the characteristic curve range for the inverted phase. It is thereby prevented that an additional, unwanted, stable characteristic curve range is produced at the inverted phase position (−90°), which would lead to erroneous locking of the phase-locked loop.

With the circuit arrangement according to the invention, a very strong reduction of phase distortion due to overmodulation is achieved, particularly in the sync pulse range. Even the very short equalizing pulses in the vertical sync signal are demodulated in an at least substantially undistorted manner. The circuit arrangement according to the invention has a very simple construction and can be manufactured without any adjustments in integrated circuit techniques. It can be used without any problem for multistandard operation.

In a preferred further embodiment, the circuit arrangement according to the invention comprises a sampling circuit which is inserted in the signal path of the seventh output signal between the superposition stage and the second filter stage for reversing this signal path in such a way that it assumes a lower transmission factor during the occurrence of sync pulses in the video signal than in the time intervals outside the sync pulses.

The sampling circuit may particularly be constituted as a sample-and-hold circuit which can perform the reversal so as to interrupt the signal path of the seventh output signal during the occurrence of sync pulses in the video signal while maintaining the value of the control signal constant during these sync pulses.

It is achieved by this sample-and-hold circuit that the portions of the video signal in which overmodulation preferably occurs are no longer used for forming the control signal for the controllable oscillator. Residual disturbances which may still occur can then be eliminated. Advantageously, the value of the control signal can be maintained constant during the sync pulses by a capacitor arranged in the second filter stage.

However, some applications have proved that the reversal of the signal path of the seventh output signal to a lower transmission factor leads to an even more certain suppression of residual disturbances as compared with the complete interruption of the signal path during the occurrence of sync pulses. Reversal may preferably be performed by switching the signal path to a higher attenuation for the seventh output signal or to a lower amplification for the seventh output signal during the sync pulses. Then there is reduced tracking of the controllable oscillator. Preferably, the seventh output signal can be attenuated to approximately 25 to 30% of its transmission during the occurrence of the sync pulses. This embodiment is advantageous, particularly in processing video signals in accordance with the L standard for non-standard amplitudes of the picture contents in the video signal or for given properties of the high frequency receiver circuit supplying the video signal which is modulated on the carrier oscillation.

In accordance with a further, advantageous embodiment, the circuit arrangement according to the invention includes a phase-shifting stage via which either the IF signal of the second demodulation stage can be applied and by which it is shifted 90° in phase with respect to the carrier oscillation frequency, or via which the carrier oscillation of the oscillator can be applied to one of the demodulation stages and by which the oscillator carrier oscillation is shifted 90° in phase. In a modification, the controllable oscillator may have a first and a second output for supplying a first carrier oscillation and a second carrier oscillation which is shifted 90° in phase with respect to the first carrier oscillation. In all cases it is achieved that the phase differences between the signals combined in the first and the second demodulation stage differ by 90°.

Advantageously, a limiter stage is provided for limiting the amplitude of the IF signal, which is applied to the first and the second demodulation stage. Consequently, disturbing influences are eliminated by means of amplitude modulation of the IF signal.

In accordance with a further embodiment, the circuit arrangement according to the invention comprises a third demodulation stage, a first input of which can receive the IF signal and a second input can receive the carrier oscillation or one of the carrier oscillations of the oscillator, and an output of which can supply a demodulated video signal, as well as a sync pulse-separating stage for obtaining sync pulses from the demodulated video signal which can be applied to the sampling circuit for reversing the transmission factor of the signal path of the seventh output signal.

In the third demodulation stage, the demodulated video signal is not only prepared for obtaining sync pulses but also for further signal processing and, for example reproduction, when the circuit arrangement according to the invention is used in a corresponding apparatus. Moreover, sync pulses can most readily be separated in the demodulated video signal.

The sync pulse-separating stage therefore advantageously comprises a black level detection stage by which a signal level corresponding to a black picture content can be detected in the demodulated video signal, which signal level can be used as a reference level for separating the sync pulses. Such a black level detection stage having a very simple and reliable construction is particularly known from DE-OS 40 40 298 which is herein incorporated by reference.

By inserting the sampling circuit in the signal path for the seventh output signal and the reversal of the transmission factor of this signal path during the sync pulses, not only a further reduction of the disturbances due to overmodulations in the range of the sync pulses is achieved but also a reduction of the influence of manufacturing tolerances of the components of the described circuit arrangement as regards its function, particularly as regards the control errors of the phase-locked loop.

In accordance with a further embodiment, the reversal of the transmission factor of the signal path of the seventh output signal in the sampling circuit can be optionally controlled by means of all sync pulses or only by means of vertical sync pulses from the demodulated video signal. To this end, the sync pulse-separating stage may preferably be switchable for separating either all sync pulses or the vertical sync pulses. The vertical sync pulses may also be preferably obtained by means of an integration stage which provides the possibility of gaining a stable sampling pulse for controlling the sampling circuit when severely disturbed IF signals having a high number of noise signals and interference pulses occur. In such cases a reversal of the transmission factor of the signal path of the seventh output signal by the sampling circuit during the horizontal sync pulses is not necessary and is still only performed during the vertical sync pulses causing very severe disturbances.

In accordance with a further embodiment, the signal path of the seventh output signal is reversed to a low transmission factor in dependence upon the transmission standard of the video signal. This measure is used for adaptation to multi-standard reception, i.e for use of the circuit arrangement for receiving video signals which are transmitted in accordance with different transmission standards. The reversal or interruption by means of the sampling circuit described can then be effected at given transmission standards, whereas it is ineffective at other transmission standards. Preferably, the reversal is rendered ineffective at transmission standards with a negative modulation of the video signal on the carrier oscillation.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENT

Figure 1:
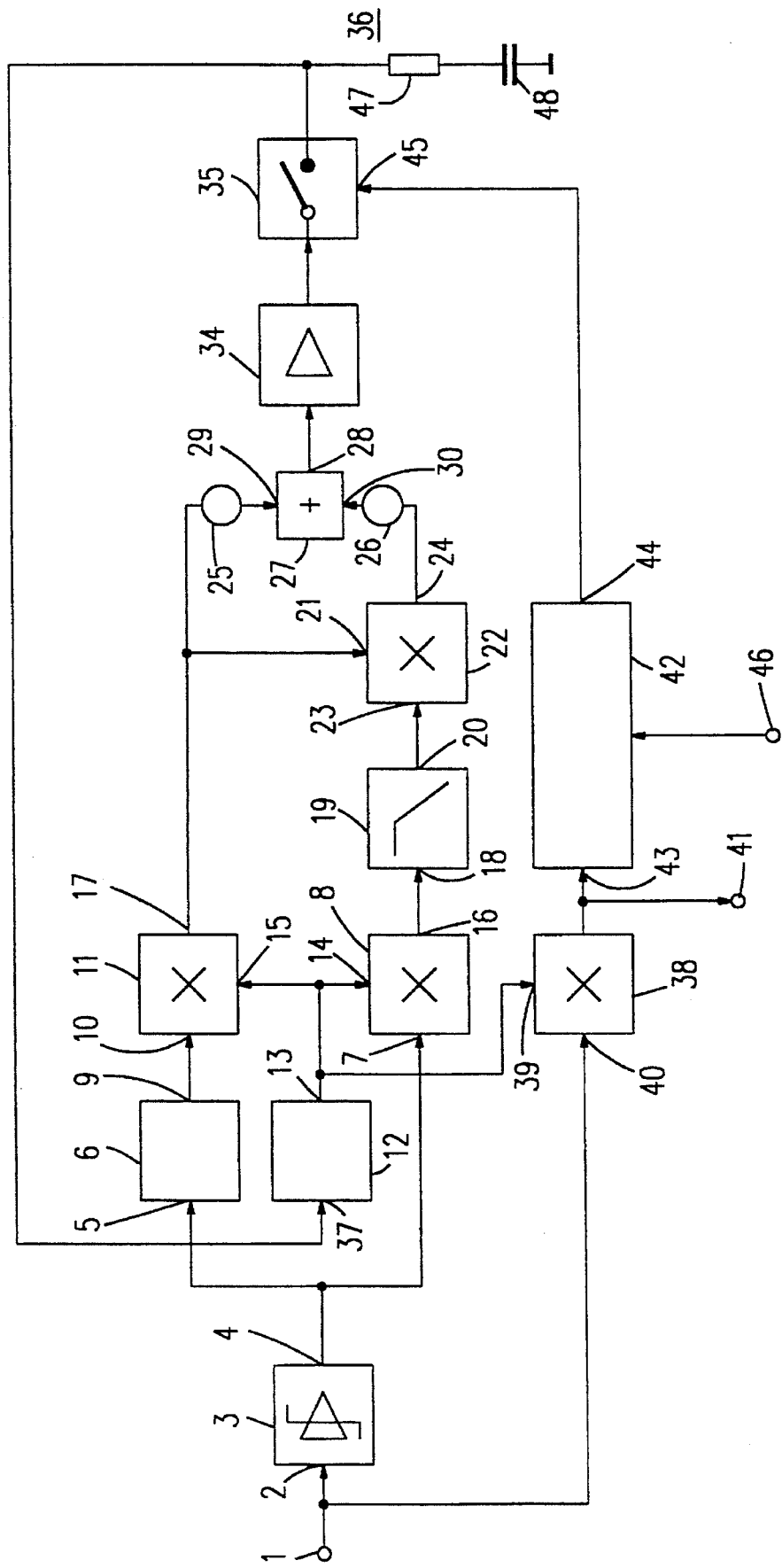
FIG. 1 shows the block diagram of a first embodiment.

Via a terminal 1, the circuit arrangement of FIG. 1 receives an IF signal at an input 2 of a limiter stage 3. In the limiter stage 3 the IF signal, i.e. the video signal which is frequency-modulated on an intermediate-frequency carrier oscillation, is limited in amplitude at a constant value and, if necessary, amplified. Preferably, the limiter stage 3 may have a structure as described in German Patent Application P 43 11 943.3 which is herein incorporated by reference. An output 4 of the limiter stage 3 supplies an IF signal which is free from unwanted amplitude modulations. This signal is applied to an input 5 of a phase-shifting stage 6 and to a first input 7 of a first modulation stage 8.

An output 9 of the phase-shifting stage 6 supplies an IF signal which, with respect to the IF signal at the input 5, is delayed by 90° with respect to its carrier oscillation. This delayed IF signal is applied to a first input 10 of a second demodulation stage 11.

An output 13 of a controllable oscillator 12 supplies a carrier oscillation which is applied to a second input 14, 15 of the first, second demodulation stage 8, 11, respectively. In this way, the phase angle between the carrier oscillations from the IF signal at the first input 10 of the second demodulation stage 11 and the carrier oscillation from the oscillator 12 at the second input 15 of the second demodulation stage 11 varies by a phase shift of 90° with respect to the phase angle of the corresponding carrier oscillations at the inputs 7 and 14 of the first demodulation stage 8. Accordingly, a first output signal, having a DC component which is proportional to the sine of the phase angle between the carrier oscillations at the inputs 10 and 15 of the second demodulation stage 11, is obtained at the output 16 of the first demodulation stage 8 from a multiplicative combination of the signals in this stage at the inputs 7 and 14, respectively, and a second output signal whose DC component is proportional to the cosine of this phase angle is obtained at the output 17 of the second demodulation stage 11.

In a modification of the embodiment described, the phase-shifting stage 6 may also be inserted in one of the connections between the output 13 of the oscillator 12 and the second inputs 14 and 15 of the demodulation stages 8 and 11, respectively. Then, a phase difference varying by 90° can also be generated between the carrier oscillations at the inputs 7 and 14 of the first demodulation stage 8 and at the inputs 10 and 15 of the second demodulation stage 11.

The first output signal is applied from output 16 of the first demodulation stage to an input 18 of a first filter stage 19 in which it is at least substantially freed from harmonic contents. A further essential function is performed by the first filter stage 19 in the unlocked state of the phase-locked loop in which the first output signal in the first filter stage 19 is subjected to a phase shift which prevents the signals supplied by the demodulation stages 8 and 11 from being eliminated during locking of the phase-locked loop in an unwanted state, such that the locking operation, i.e., controlling the controllable oscillator 12 at its correct frequency and phase of the carrier oscillation, is disturbed. With an ideal filtering in the first filter stage 19 constituted as a low-pass filter, a third output signal is obtained at its output 20, which output signal corresponds to the DC component of the first output signal in the locked state of the phase-locked loop and is thus proportional to the sine of the phase angle between the carrier oscillations at the inputs 10 and 15 of the second demodulation stage 11.

The second output signal from the output 17 of the second demodulation stage 11 is applied to a first input 21 of a multiplier stage 22, whereas the third output signal from the output 20 of the first filter stage 19 is applied to a second input 23 of the multiplier stage 22. The second and the third output signals are multiplicatively combined in the multiplier stage 22, so that a fourth output signals is supplied from the output 24 of the multiplier stage 22, whose DC component is proportional to the product of the sine and the cosine of the phase angle between the carrier oscillations at the inputs 10 and 15 of the second demodulation stage 11. Since all higher harmonics from the first output signal are at least substantially suppressed in the first filter stage 19, no additional DC components are produced as mixed products in the fourth output signal due to the multiplicative combination in the multiplier stage 22, which DC components could otherwise distort the dependence of this fourth output signal on the phase angle of the carrier oscillations at the inputs 10 and 15.

In the following arrangement, a seventh output signal is derived as a linear combination of the second and the fourth output signal from two coefficient members 25, 26 and a superposition stage 27, and is supplied from an output 28 of the superposition stage 27. To this end, the second output signal is multiplied in the first coefficient member 25 by a first coefficient k1 and in this way a fifth output signal is obtained. In a corresponding manner, a sixth output signal is generated from the fourth output signal in the second coefficient member 26 by multiplication by a second coefficient k2. In the superposition stage 27, whose first input 29 is connected to the first coefficient member 25 and whose second input 30 is connected to the second coefficient member 26, the fifth and sixth output signals are additively superposed, from which the seventh output signal is formed.

Figure 2:
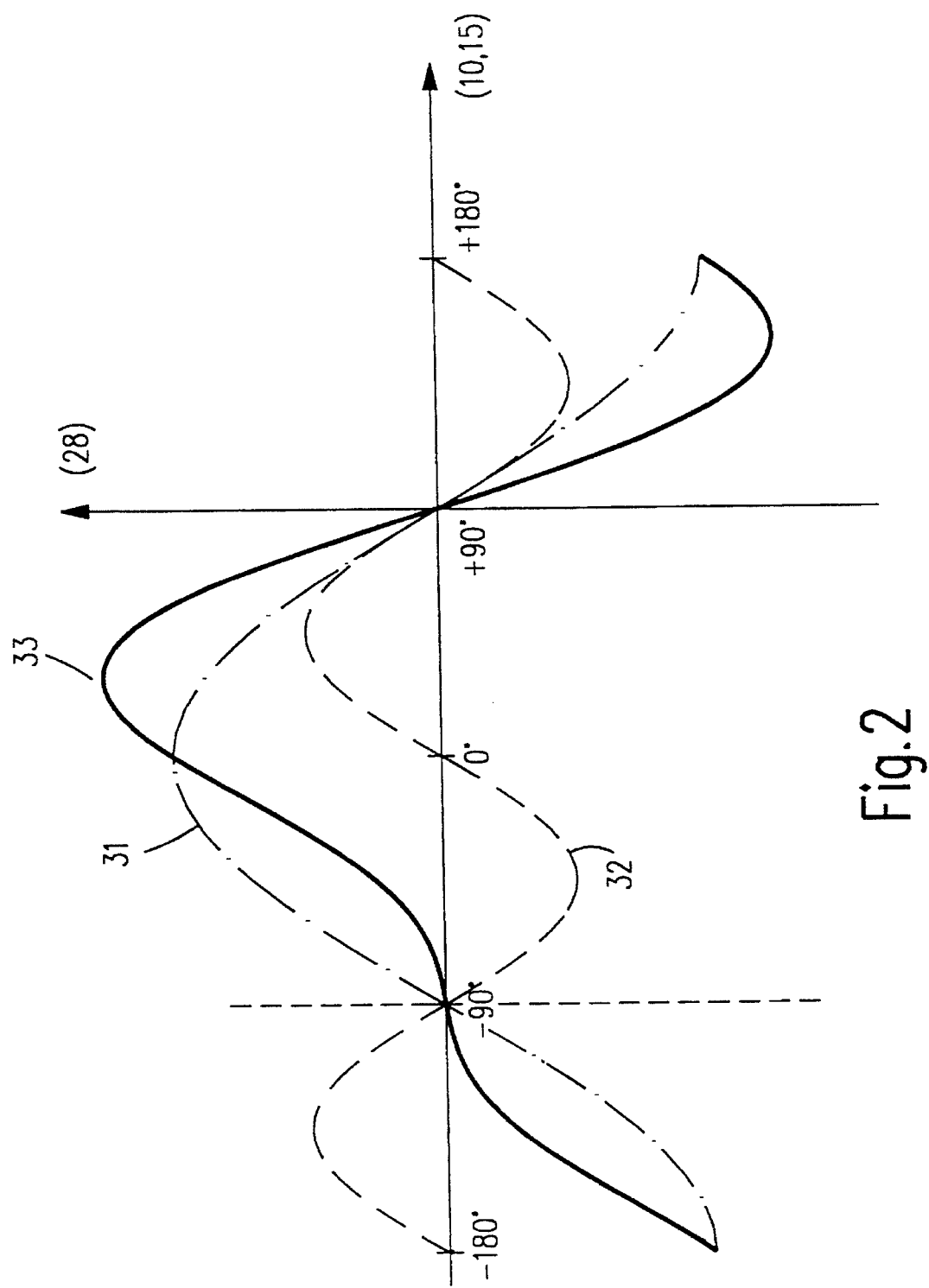
FIG. 2 shows the characteristic curve of the circuit arrangement of FIG. 1 for the seventh output signal generated therein and which is dependent on the phase angle between the IF signal and the carrier oscillation of the controllable oscillator.

FIG. 2 shows the relation, created by the afore-described combinations of the output signals, between the seventh output signal and the phase angle between the carrier oscillations at the inputs 10 and 15 of the second demodulation stage 11, in the form of a characteristic curve of the circuit comprising the phase-shifting stage 6, the demodulation stages 8 and 11, the oscillator 12, the first filter stage 19, the multiplier stage 22, the coefficient members 25, 26 and the superposition stage 27. The phase angle is plotted horizontally and the seventh output signal as its function is plotted vertically. The dot-and-dash curve corresponds to the second output signal and hence to a cosine-shaped dependence on said phase angle; this curve is denoted by the reference numeral 31. A broken-line curve shows the fourth output signal as a function of the described phase angle in FIG. 2 and is denoted by the reference numeral 32. The solid-line curve 33 denotes the seventh output signal as a linear combination of the curves 31 and 32 formed in the manner described. The circuit described hereinbefore with reference to FIG. 1 has its working point at a phase angle of +90°.

Curve 33 as characteristic curve F of the circuit arrangement described with reference to FIG. 1 as a function of the phase angle phi is thus defined by the equation $$F(phi) = k1 \cdot \cos(phi) + k2 \cdot \sin(phi) \cdot \cos(phi).$$

If the coefficients k1, k2 are to be given in a normalized representation, it holds that $$k1 + k2 = 1.$$

In the described overmodulation with inverted phase, a working point at −90° is produced in the diagram of FIG. 2. At this point, the curve 33, as characteristic curve of the described circuit arrangement of FIG. 1, has a flat part or saddle whose accurate variation depends on the choice of the coefficients k1, k2. For the invention, the value of the first coefficient k1 is fixed to be larger than the value of the second coefficient k2. Then the curve 33 always shows a positive rise at the phase angle of −90° so that here no stable characteristic curve range with a negative rise similarly as with the working point at the phase angle of +90° is formed. In a preferred embodiment, the value of the first coefficient k1 is fixed at 0.55 and the value of the second coefficient k2 is fixed at 0.45.

The seventh output signal is applied from the output 28 of the superposition stage 27 to a second filter stage 36 via an amplifier stage 34, in which preferably also a voltage-current conversion can be performed, as well as via a sampling circuit 35 formed as a sample-and-hold circuit in the relevant embodiment, said filter stage operating as a loop filter from which the seventh output signal is applied as a control signal to a control input 37 of the oscillator 12 for controlling the frequency or phase of the carrier oscillation provided by this oscillator. The demodulation stages 8, 11 of the oscillator 12, the phase-shifting stage 6, the first filter stage 19, the multiplier stage 22, the coefficient members 25, 26, the superposition stage 27, the amplifier stage 34, the sample-and-hold circuit 35 as well as the second filter stage 36 constitute a phase-locked loop, also referred to as FPLL. The frequency or phase detector operative for this FPLL has the characteristic curve identical to curve 33 in FIG. 2. The gain factor of the amplifier stage 34 and the values of the coefficients k1, k2 are commonly used in the loop gain of this FPLL and can accordingly be chosen mutually. The sample-and-hold circuit 35 and the interruption of the signal path achieved with this circuit prevents that overmodulations occurring during the sync pulses and leading to an inverted phase position of the carrier oscillation modulated with the video signal create an erroneous control signal which may unlock the FPLL. With this FPLL a carrier oscillation for demodulating the IF signal at the terminal 1, i.e. for obtaining a demodulated video signal from this IF signal is generated by the oscillator 12.

A first input 39 of a third demodulation stage 38 receives the carrier oscillation from the oscillator 12 and a second input 40 receives the IF signal from the terminal 1. At an output 41, the third demodulation stage 38 supplies a demodulated video signal. This signal may be used on the one hand for further processing, for example for display or recording, and for obtaining or separating the sync pulses contained therein. In the latter case the demodulated video signal is applied from the output 41 to a sync pulse-separating stage 42 via its input 43. The sync pulse-separating stage may preferably comprise a black level detection stage as is known, for example, from DE-OS 40 40 298. A black level is derived from the demodulated video signal and serves as a cut-off level for separating the sync pulses from the demodulated video signal, for example, by means of a comparator circuit. For controlling the interruption of the signal path of the seventh output signal, from an output 44 of the sync pulse-separating stage 42 to a control signal input 45 of the sample-and-hold circuit 35 the separated sync pulses are applied as a control signal. The signal path of the seventh output signal is thereby interrupted during the period of the sync pulses.

The sync pulse-separating stage 42 also has a switching input 46 via which the sync pulse separation is switchable in such a way that all sync pulses appear as control signals at the output 44 in one state of operation, and that in a second state of operation, the pulses separated from the demodulated video signal are integrated in such a way that a control signal for interrupting the signal path of the seventh output signal occurs at the output 44 only during the occurrence of the vertical sync pulses. Consequently, errors due to interference pulses, which might otherwise be interpreted as sync pulses, are avoided in severely disturbed video signals. Basically, circuit arrangements are known with which it can be ascertained whether the available, demodulated video signal (or also the IF signal) is severely disturbed. Switching via the switching input 46 can then also be performed automatically.

In FIG. 1, the second filter stage 36 is formed in a simple manner as a low-pass filter composed of a series arrangement of a resistor 47 and a capacitor 48 forming a shunt between the connection from the sample-and-hold circuit 35 to the control input 37 of the oscillator 12 and ground. In the intervals of interruption of the signal path of the seventh output signal, the capacitor 48 stores the last value of this control signal for the oscillator 12.

Figure 3:
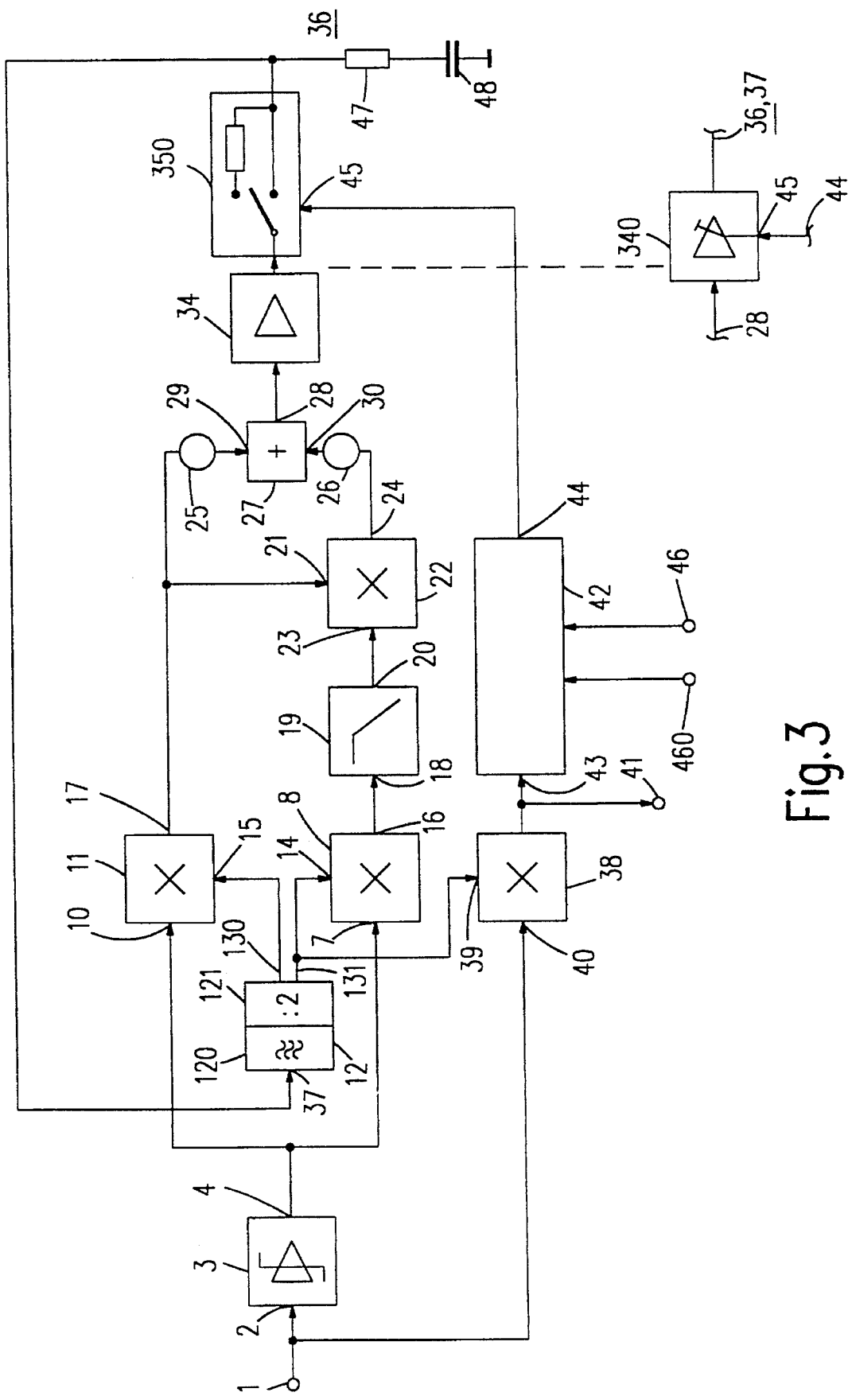
FIG. 3 shows the block diagram of a second embodiment.

FIG. 3 shows a modification of the circuit arrangement of FIG. 1, in which corresponding elements are again denoted by the same reference numerals. Since the function of these elements having the same numerals also corresponds to that of the elements shown in FIG. 1, please refer to the description of FIG. 1.

The embodiment shown in FIG. 3 differs from that in FIG. 1 by a different construction of the controllable oscillator 12. This oscillator comprises an oscillation-generating stage 120 supplying an oscillation at double the frequency of the carrier oscillation. This oscillation is divided into half its frequency, i.e., the carrier oscillation frequency is derived in a divider stage 121 arranged subsequent to the oscillation-generating stage 120. The divider stage 121 supplies a first carrier oscillation from a first output 130 of the oscillator 12 and a second carrier oscillation from a second output 131 of the oscillator 12, which second carrier oscillation is shifted 90° in phase with respect to the first carrier oscillation. The first carrier oscillation from the first output 130 is applied to the second input 15 of the second demodulation stage 11, whereas the second carrier oscillation from the second output 131 of the oscillator 12 is applied to both the second input 14 of the first demodulation stage 8 and to the first input 39 of the third demodulation stage 38. Consequently, the phase-shifting stage 6 between the output 4 of the limiter stage 3 and the first input 10 of the second demodulation stage 11 of FIG. 1 can be dispensed with; the phase positions of the single signals are, however, unchanged with respect to the embodiment shown in FIG. 1.

FIG. 3 further shows a modified example of a sampling circuit which is denoted by the reference numeral 350. The sampling circuit 350 is inserted, in a manner similar to that in FIG. 1, in the signal path for the seventh output signal between the amplifier stage 34 and the second filter stage 36 and has its control signal input 45 again connected to the output 44 of the sync pulse-separating stage 42. The sampling circuit 350 is formed in such a way that, upon the occurrence of sync pulses in the video signal, the signal path of the seventh output signal is switched from the direct connection to a connection transmitting the seventh output signal in an attenuated manner only, which connection is shown in FIG. 3 by means of an ohmic resistor within the sampling circuit 350. Preferably, the transmission of the seventh output signal as a control signal for the oscillator 12 can be attenuated during the sync pulses to approximately 25 to 30% of the value of the transmission factor in the time intervals between the sync pulses. An attenuated adjustment of the oscillator 12 during the sync pulses is then obtained.

FIG. 3 also shows as a particular detail a modification of the combination comprising the amplifier stage 34 and the sampling circuit 350 and which is formed as an amplifier stage 340 with a switchable or controllable gain. This amplifier stage 340 may be inserted in the manner shown between the output 28 of the superposition stage 27, the second filter stage 36 and the control input 37 of the oscillator 12 and the output 44 of the sync pulse-separating stage 42 and then replaces the amplifier stage 34 and the sampling circuit 350 in FIG. 3. By reversing the gain factor of the amplifier stage 340, a reversal of the transmission factor of the signal path for the seventh output signal is obtained in a manner which is equivalent to that in the embodiments described.

In a further modification of FIG. 1, which similarly to the modifications of FIG. 1 described with reference to FIG. 3 can be used independently, the sync pulse-separating stage 42 shown in FIG. 3 has a second switching input 460 via which the sync pulse-separating stage 42 can receive a signal by which the signal path of the seventh output signal can be reversed in the sampling circuit 350 (or the amplifier stage 340) in dependence upon the transmission standard of the video signal. Particularly, the reversal at a negative modulation of the video signal on the carrier oscillation may then be dispensed with, but also, for example, in the NICAM stereo pilot transmission or for further transmission standards of the video signal.

A correct demodulation, also of the vertical sync pulses and even at a strong overmodulation, is rendered possible by means of the circuit arrangement according to the invention. Amplitude and pulse shape are substantially maintained. The invention provides this possibility while using a small number of components.

We claim:

1. A circuit arrangement for demodulating a video signal (IF signal) which is frequency-modulated on an intermediate-frequency carrier oscillation, comprising:

a first demodulation stage formed as a frequency or phase demodulator for multiplicatively combining the IF signal with a carrier oscillation of a controllable oscillator and for supplying a first output signal formed from this combination, a second demodulation stage formed as a frequency or phase demodulator for multiplicatively combining the IF signal with the carrier oscillation phase-shifted by a quarter period of the intermediate-frequency carrier oscillation, and for supplying a second output signal formed from this combination, a first filter stage for low-pass filtering the first output signal and for supplying a third output signal, a multiplier stage for multiplicatively combining the second output signal and the third output signal to derive a fourth output signal, a superposition stage for forming a seventh output signal by additively combining a fifth output signal and a sixth output signal derived from the second output signal and the fourth output signal, respectively, and a second filter stage for deriving a control signal from the seventh output signal for controlling the frequency and/or phase of the controllable oscillator, characterized by a first coefficient member for deriving the fifth output signal from the second output signal, and a second coefficient member for deriving the sixth output signal from the fourth output signal, the signal applied to each coefficient member being multiplied by a predeterminable coefficient (k1, k2) for forming the signal derived therefrom, and the coefficient (k1) of the first coefficient member being chosen to be larger than the coefficient (k2) of the second coefficient member.

2. A circuit arrangement as claimed in claim 1, further comprising a sampling circuit which is connected in the signal path of the seventh output signal between the superposition stage and the second filter stage for altering this signal path in such a way that it assumes a lower transmission factor during the occurrence of sync pulses in the video signal than in the time intervals outside the sync pulses.

3. A circuit arrangement as claimed in claim 2, wherein the sampling circuit comprises a sample-and-hold circuit which can interrupt the signal path of the seventh output signal during the occurrence of sync pulses in the video signal while maintaining the value of the control signal constant during the sync pulses.

4. A circuit arrangement as claimed in claim 2, further comprising a third demodulation stage, a first input of which can receive the IF signal and a second input can receive the carrier oscillation or one of the carrier oscillations of the oscillator, and an output of which can supply a demodulated video signal, and a sync pulse-separating stage for obtaining sync pulses from the demodulated video signal which can be applied to the sampling circuit for reversing the transmission factor of the signal path of the seventh output signal.

5. A circuit arrangement as claimed in claim 4, wherein the sync pulse-separating stage comprises a black level detection stage by which a signal level corresponding to a black picture content can be detected in the demodulated video signal, which signal level can be used as a reference level for separating the sync pulses.

6. A circuit arrangement as claimed in claim 4, wherein the reversal of the transmission factor of the signal path of the seventh output signal in the sampling circuit can be optionally controlled by means of all sync pulses or only by means of vertical sync pulses from the demodulated video signal.

7. A circuit arrangement as claimed in claim 4, wherein the signal path of the seventh output signal is reversed to a low transmission factor in dependent upon the transmission standard of the video signal.

8. A circuit arrangement as claimed in claim 1, further comprising a phase-shifting stage (6) via which the IF signal is applied to the second demodulation stage (11) and by which it is shifted 90° in phase with respect to the carrier oscillation frequency.

9. A circuit arrangement as claimed in claim 1, further comprising a phase-shifting stage via which the carrier oscillation of the oscillator can be applied to one of the demodulation stages and by which the carrier oscillation of the oscillator is shifted 90° in phase.

10. A circuit arrangement as claimed in claim 1, wherein the controllable oscillator has a first output and a second output for supplying a first carrier oscillation and a second carrier oscillation which is shifted 90° in phase with respect to the first carrier oscillation.

11. A circuit arrangement as claimed in claim 1, further comprising a limiter stage for limiting the amplitude of the IF signal which is applied to the first and the second demodulation stage.

* * * * *